April 1, 1941. D. W. BERLIN 2,236,639
AUTOMATICALLY VARIABLE CHANGE SPEED GEAR DEVICE
Filed March 22, 1938 2 Sheets-Sheet 1
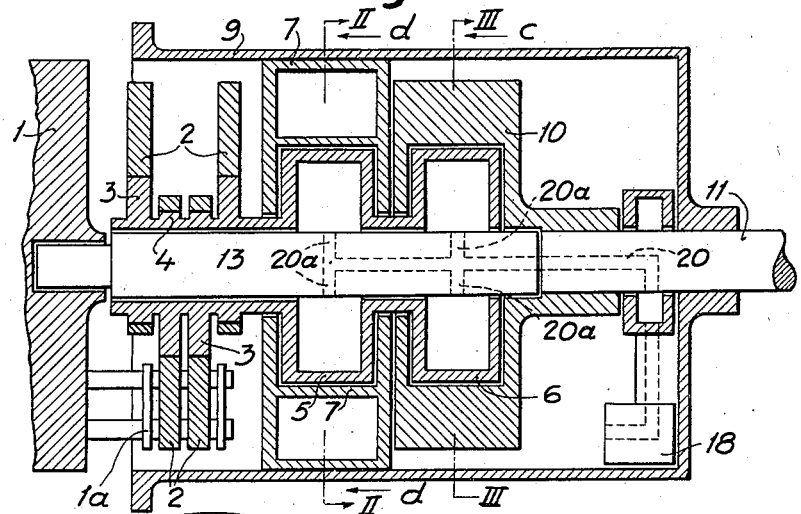
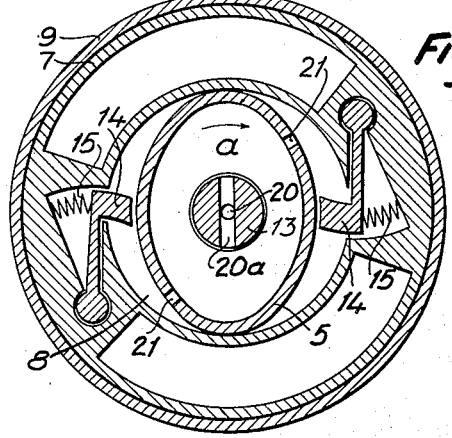
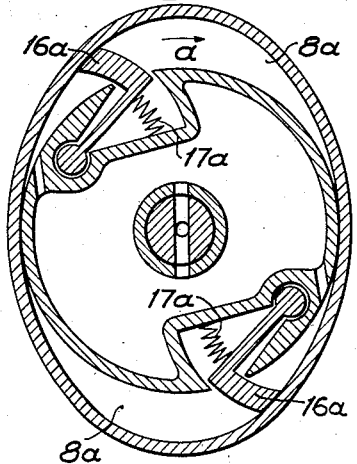
D. W. Berlin, Inventor
By Glascock Downing & Seebold, Attys.

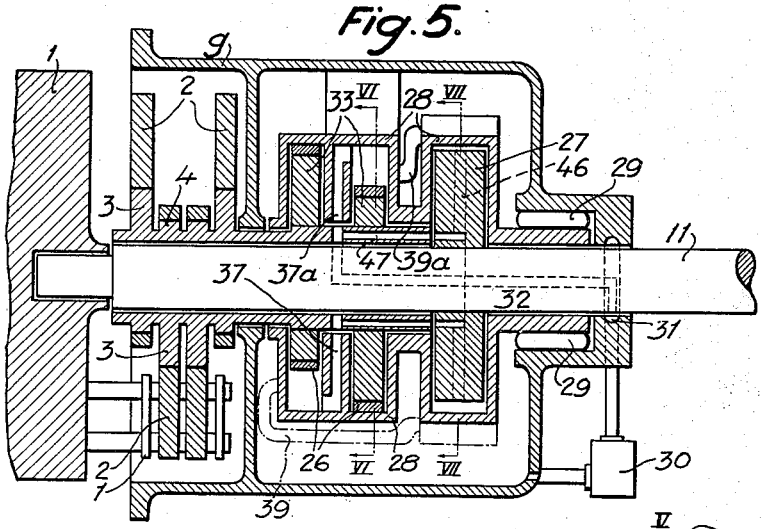
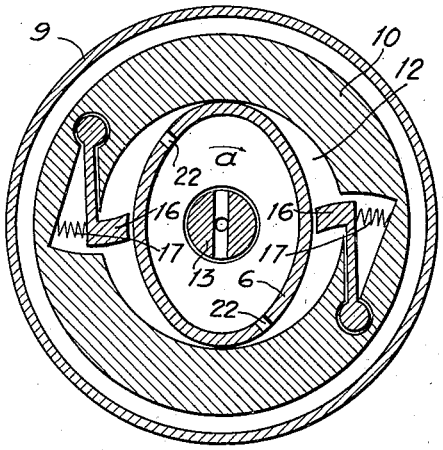
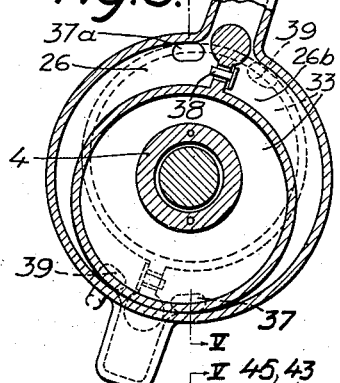
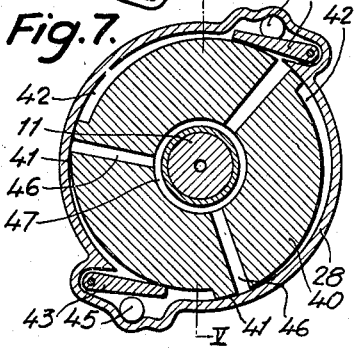

Patented Apr. 1, 1941

2,236,639

UNITED STATES PATENT OFFICE 2,236,639

AUTOMATICALLY VARIABLE CHANGE SPEED GEAR DEVICE

David Werner Berlin, Rasunda, Sweden

Application March 22, 1938, Serial No. 197,519
In Sweden March 31, 1937

13 Claims. (Cl. 74—64)

The present invention relates to an automatically variable change speed gear device according to the centrifugal weight principle, in which the power impulses from the centrifugal weights are transmitted to a driven shaft by means of a liquid medium, which either constitutes a checking means or acts as a power-transmitting, circulating fluid. In the former case the mechanical roller checking means generally used in such change speed gear devices have been replaced by a hydraulic checking system, which has the great advantage of providing for a practically noiseless gearing run, which is considerably smoother and does not strain the material of the parts of the construction to the same great extent. This part of the invention is characterized substantially thereby that an intermediate member, which is driven by the centrifugal weights during gearing run, is connected with the driven shaft by means of hydraulic liquid checking means transmitting the impulses of the centrifugal weights to said shaft. In the latter case the power transmission is effected from the driving shaft to the driven shaft according to the invention by means of a liquid medium, which is pumped from the driving shaft to the driven shaft and transmits the energy in the form of static pressure from the pumping members of the driving shaft to the receiving members of the driven shaft. Per unit of time the pumping members of the driving shaft propels a quantity of pressure liquid inversely proportional to the resistance so that the gear ratio increases with increased resistance and decreases with decreasing resistance. By the pressure being effected entirely statically, sliding, which does not produce any heat, arises between the driving and the driven members within the gear box contrary to the common hydraulic friction clutches, due to which the formation of heat is little and the efficiency very high in the present change speed gear device.

One embodiment of the firstmentioned part of the invention may consist therein that the driving shaft actuates centrifugal weights, which transmit the power in the form of positive and negative impulses to an eccentric sleeve, which, on one hand, is provided with eccentrics around which the centrifugal weights rotate, and on the other, is provided with piston members, which together with hydraulic liquid checking means transmit the positive and negative impulses to the driven shaft. The impulses are transmitted to the driven shaft in such a manner that the same alternatingly, one after the other, cause the same to turn in positive direction or, i. e., in one direction only. In such a case transmission members are used for transforming the negative impulse in accordance with, for example, the U. S. Patent No. 1,939,100.

Another embodiment of the firstmentioned part of the invention may consist therein that the driving shaft actuates centrifugal weights, which transmit the power in the form of positive and negative impulses to an intermediate member, in the shape of a sleeve, which, on one hand, is provided with eccentrics, around which the centrifugal weights rotate, and, on the other hand, with piston members, which together with hydraulic liquid checking means transmit the positive impulses direct to the driven shaft and receive the negative impulses against a stationary support. In this case the positive impulses are transmitted direct to the driven shaft, and the negative impulses are received by the fly-masses and are transmitted, via the same, to the driven shaft together with the positive impulses.

The piston members of the eccentric sleeve rotate in chambers, which, at one or more places, are shut by means of flap-like members against the piston members, so that the piston members are free in the direction of rotation from the flaps but checked in the direction of rotation against them by the intermediate pressure fluid, which by the flaps is prevented from escaping. The piston members may be provided with one or more cams or erect portions, which tighten closely against the walls of the circular casing and against which the flaps are pressed by the pressure fluid. In order to provide for gearing one of the piston members of the eccentric sleeve must be checked in one direction against a stationary support, preferably the gear box casing. If the positive and negative impulses are separately successively transmitted to the driven shaft there are further two piston members or roller checking means. If the impulses are transmitted jointly there is a second piston member, which is checked against the driven shaft, possibly in a fly-mass secured to the same and shaped in a suitable manner. The flaps for the hydraulic liquid checking means are loaded by the pressure of liquid, on that side, which is remote from the piston members, in which case the same have a checking action. The quantity of pressure liquid, which possibly is lost by leakage in the bearings, is successively replaced by means of a separate pump, which is driven in some suitable manner. In case the pressure liquid must be cooled in a special cooling device, the liquid is caused to circulate between the cooling device and the change speed gear device, the circulation being effected by the pump. For small change speed gear devices it is sufficient to cool the pressure liquid by means of the walls of the members, which are then cooled on the outside by means of pressure liquid cooled by air, which liquid in a certain quantity is present in the gear box casing. The direction of rotation of the driven shaft may be shifted to the opposite one either by changing the checking positions to the opposite direction or by means of a reverse gear in the usual manner. In order to obtain overgear or a lower gear for acceleration such means may directly be applied to the driven shaft of the change speed gear device. When the driving and the driven torque have approximately the same value direct coupling is effected via a pressure-fluid liquid checking means by the eccentric sleeve being checked by the centrifugal-weights and rotating with the same.

One embodiment of part of the invention, which relates to power transmission by means of a circulating, liquid fluid, is characterized by pump members, which are actuated by the centrifugal weights for generating positive and negative pump impulses of the liquid fluid, which impulses, by receiving members, are transmitted into rotary motion on a driven shaft. The said receiving members, which are secured to the driven shaft, may be constructed in the form of one (or more) rotating piston, provided with tightening flaps, or as toothed wheels or vane wheels in combination with wheels or other members moving in the opposite direction. The centrifugal weights are actuated to rotate by the driving shaft and are eccentrically mounted on one (or more) pump piston, around or beside which the same rotate during gearing and impart to the same an oscillatory, reciprocating motion, a liquid pressure medium being pumped to the chamber, in which receiving members, secured to the driven shaft, are actuated to cause the shaft to rotate in a certain direction. To the pump piston (or the pump pistons) is imparted either an oscillatory motion around its longitudinal axis or in the direction of the latter. The pump piston, which is actuated by the centrifugal weights, and the receiving member or members, which are secured to the driven shaft and actuated by the pressure medium, are enclosed in a casing, which during gearing practically is at rest but, during direct run, participates in the rotation, in which case pump piston and receiving members are at rest in relation to the casing. During direct run the pump piston is checked by the centrifugal weights relatively to the latter and causes the casing to participate in the rotation, which, by means of the pressure medium, checks the receiving members and the driven shaft, so that the same participates in the direct motion. During gearing work the liquid, pressure medium in the casing circulates between the chambers for driving and driven members and is cooled by the walls of the casing. During the circulation the pressure medium may, of course, during its return, pass through a suitable cooling device, which either participates in the rotation or stands still. The loss, by leakage, of liquid, pressure medium in the casing and the pump chambers is replaced by a separate pump, which supplies cooled-down, pressure liquid to the low or high pressure side within the system of circulation. The direction of motion of the driven shaft is reversed to the opposite one either by changing the direction of circulation of the pressure liquid and checking the casing in the opposite direction or, in the usual manner, by means of a reverse gear. The pump piston driven by the centrifugal weights may have a greater capacity per revolution of the motor than the receiving members provided at the driven shaft, which results therein that at almost full stroke of the oscillating piston the driven shaft is given a greater speed of rotation than the driving shaft during gearing, by which so-called overgearing may be effected. The case may of course also be the reversed, when during gearing the driven shaft is not able to attain the speed of rotation of the driving shaft.

Some embodiments of this invention are shown on the accompanying drawings.

One embodiment of the invention, in which a liquid medium releases checking means, is shown in the Figures 1–4.

Figure 1 shows a vertical, longitudinal section, and

Figure 2 a vertical cross section on the line II—II, of Figure 1, and

Figure 3 a vertical cross section on the line III—III, of Figure 1.

Figure 4 shows the said cross sections in a modified form.

One embodiment of the invention, in which liquid serves as a power-transmitting, circulating fluid, is illustrated in Figures 5–7.

Figure 5 shows a vertical, longitudinal section on the line V—V, of Figures 6 and 7, of a gear box, and Figure 6 a vertical, cross section on the line VI—VI, of Figure 5, and Figure 7 a vertical, cross section on the line VII—VII, of Figure 5.

In the following, the embodiment according to Figures 1–4 is going to be described first.

1 is the fly-mass of the driving shaft, which mass is assumed to rotate in the direction indicated by the arrow $a$, in Figures 2–4, and which, by means of link members $1a$, is connected with the centrifugal weights 2, which are mounted on and rotate around eccentrics 3. Said eccentrics are secured to the eccentric sleeve 4 and actuate the same to move stepwise during gearing run and to rotate during direct run. On the accentric sleeve 4 there are further two piston members 5 and 6. The piston member 5 is enclosed in a casing 7 and rotatable in the space 8 formed by the casing. The casing 7 is secured in the casing 9. The piston member 6 is rotatable in a similar space 12 in a casing 10, which is secured to the driven shaft 11 and is formed as a fly-mass for the latter. The eccentric sleeve 4 with its members is carried by an intermediate shaft 13, which, with its one end, is mounted in the fly-mass 1 and, with its other, in the hub portion of the casing 10. During gearing run the member 5 turns stepwise in the checking space 8, for example, in the direction of the arrow $a$ during the positive impulse of the centrifugal weights, flap-shaped checking members 14 allowing the member to move in the direction indicated by the arrow $a$, but checking the piston member 5 in the opposite direction, i. e. during the negative impulse, by the action of the pressure liquid, which then acts on the piston member 5 and on the end surfaces and rear sides of the flaps 14. In order to hold the flaps against the piston member so as to always enable the pressure liquid to actuate the same, they are loaded by springs 15. By the piston member 5 being checked during the negative impulse, the said impulse accelerates the fly-mass 1 and the centrifugal weights 2 and is released thereby as a positive impulse together with the positive impulse, which by the piston 6 and the flaps 16 is transmitted to the fly-mass 10 by the flaps being then pressed against the fly-mass by the pressure liquid. During such operation the piston member 6 takes the fly-mass 10 along in the movement every time it turns one step forwards in the direction of the arrow a, but allows the same to move freely between the steps, i. e. every time the negative impulse accelerates the fly-mass 1 in the same direction, since the flaps 16 make no resistance then. In this manner the positive impulses are transmitted to the driven shaft. Also the flaps 16 are spring-loaded with springs 17, which permanently hold them in such a manner that the pressure liquid is able to actuate them. Supplying of pressure liquid is provided for by a pump 18, which sucks liquid from the bottom of the casing 9 and presses the same through the ducts 20 and 20a to the cavities of the pistons and from there through the holes 21 and 22 to the checking spaces 8 and 12, respectively. Said pump may be a common piston pump, eccentric pump or gear pump.

In order to utilize the centrifugal force at the tightening between the flaps and the corresponding casing, the flaps, as shown in Figure 4, may be built-in in the piston, which for this case is made circular, the space in the casing being made oval with two cavities 8a or three or more with a corresponding number of cavities or checking spaces. When the piston is rotated in the direction of the arrow a the checking means are pressed against the casing by the pressure of the liquid and the casing is taken along in the movement.

Assuming Figure 4 to be a section III—III, of Figure 1, and viewed in the direction of the arrow c, the device would transmit the positive impulse. Assuming it to be a section II—II, of Figure 1, and viewed in the direction of the arrows d, the same figure would show the device when constructed for transmitting the negative impulse. In the shown embodiment the centrifugal force and the springs 17a will, jointly, actuate the flaps 16a outwards.

If gearing members are used for transforming the negative impulse into a positive impulse the piston members will oscillate during gearing run.

The embodiment according to Figures 5-7:

1 indicates the fly-wheel of the motor, said wheel representing the driving shaft. 11 is the driven shaft. On the latter is mounted the eccentric sleeve 4, around the eccentrics of which the centrifugal weights 2 are mounted. The centrifugal weights 2 have jointed connection with the fly-wheel 1 by means of link members 1a. At its opposite end the eccentric 4 is shaped as pump members 26 pressing the liquid, pressure medium up to the receiving members 27, which are secured on the shaft 11. The pump members 26 and the receiving members 27 are wholly (or partly) surrounded by a casing 28, in which the ducts for the pressure medium are (wholly or partly) located. The casing 28 receives the counter-pressure from the pressure medium during gearing and, consequently, that fixed point, around which the gearing can take place is located in said casing. The casing 28 must, therefore, when gearing the torque of the driving shaft, upwards or downwards, be checked against the direction of motion of the driven shaft, which is effected by means of a checking device 29, which checks the casing in the gear box casing 9 against rotation in one direction. This device may either be mechanical and consist of checking rollers, as shown on the drawings, or it may be hydraulic. By changing the checking direction and reversing the flowing direction of the pressure medium, the rotary motion of the driven shaft 11 may be reversed. According as pressure liquid leaks out of the casing 28 through the bearings and other leaky parts, if any, new liquid is supplied by means of a pump 30, which pumps in liquid, at 31, and further through the duct 32 to the pump casing with the pump members 26.

Figure 6 shows an embodiment of the pump members 26, which are given a reciprocating oscillatory motion during gearing run by means of eccentrics 33 and are diametrically positioned with respect to each other. The eccentrics are secured to the eccentric sleeve 4. The pressure liquid is introduced into the fore pump, in Figure 6, through the duct 37a in the suction chamber 26a of the pump, passes past the check valve 38 (provided in the appertaining pump member 26), into the pressure chamber 26b and is pressed out through the duct 39a.

The course is the corresponding in the pump chamber behind. The corresponding ducts are indicated by 37 and 39. The ducts 37 and 37a are in communication with each other.

The duct 39 is shown, in Figure 5, in dot-dash lines, because the same is in reality located in front of the section plane, as will be seen on comparing with Figure 6.

Figure 7 shows an embodiment of a receiving member, which consists of a rotating piston 40, secured to the shaft 11 and provided with cams 41, which border the chamber against the casing 28 at certain points, so that spaces 42 for pressure liquid are formed, into which flaps 43 swing alternatingly and, at the same time, give the pressure liquid free passage therethrough, so that the same actuates the cams 41 for the turning of the piston 40. The flaps 43 may rest against the piston 40 by means of rollers so as to make the friction against the same little. The pressure liquid enters through the ducts 45 and leaves through the ducts 46 to the return duct 47.

From the foregoing it is clear that the pressure liquid from the pressure chamber of the pump must pass through the receiving member, before returning to the suction chamber of the pump and will thereby have a driving action on the piston 40.

Having now described my invention, what I claim as new and desire to secure by Letters Patent is:

1. An automatically variable change speed gear device including a drive shaft, a driven shaft, an oscillating shaft having eccentrics thereon, centrifugal weights carried by and rotating with said drive shaft and coacting with said eccentrics to impart power impulses to the eccentric shaft, and fluid pressure means to transmit the power impulses from the eccentric shaft to the driven shaft.

2. An automatically variable change speed gear device as claimed in claim 1, characterized in that said fluid pressure means includes fluid check devices operable to impart a uni-directional movement to the driven shaft from the oscillating shaft.

3. An automatically variable change speed gear device as claimed in claim 1, characterized in that said fluid pressure means includes pump-like devices operable by the oscillating shaft to impart a uni-directional movement to the driven shaft.

4. An automatically variable change speed gear device as claimed in claim 1, characterized in that said oscillating shaft is in the form of a sleeve and that said fluid pressure means includes piston members connected with the oscillating shaft.

5. An automatically variable change speed gear device as claimed in claim 1, characterized in that the fluid pressure means includes pistons adapted to transmit the oscillating movement of the oscillating shaft in one direction direct to the driven shaft.

6. An automatically variable change speed gear device as claimed in claim 1, characterized in that said fluid pressure means includes pistons operated by said oscillating shaft, casings rotatably receiving said pistons, and means interposed between said casings and pistons whereby the latter may move freely in one direction and are checked in the opposite direction.

7. An automatically variable change speed gear device as claimed in claim 1, characterized in that said fluid pressure means includes piston members actuated by the oscillating shaft, a fluid check device intermediate one of the pistons and a stationary body, and a fluid check device between the other piston and the driven shaft.

8. An automatically variable change speed gear device as claimed in claim 1, characterized in that said fluid pressure means includes pistons operated by said oscillating shaft, casings rotatably receiving said pistons, and means interposed between said casings and pistons whereby the latter may move freely in one direction and are checked in the opposite direction, said intermediate means including fluid pressure loaded flaps.

9. An automatically variable change speed gear device as claimed in claim 1, characterized in that said fluid pressure means includes a separate pump for maintaining a predetermined quantity and pressure of fluid.

10. An automatically variable change speed gear device as claimed in claim 1, characterized by the provision of means for reversing the direction of rotation of the driven shaft.

11. An automatically variable change speed gear device as claimed in claim 1, characterized in that said fluid pressure means includes pistons actuated by the oscillating shaft, casings rotatably receiving said pistons, a casing enclosing the first mentioned casings and adapted during gearing to remain at rest and, during direct drive, to participate in the rotation of the driven shaft while the piston and associated casings are stationary relative to the enclosing casing.

12. An automatically variable change speed gear device as claimed in claim 1, characterized in that said fluid pressure means includes pistons operated by said oscillating shaft, casings rotatably receiving said pistons, a casing enclosing the first mentioned casings, the pistons being checked by the centrifugal weights, when the device changes from gearing to direct drive, and causing the casing to participate in the rotation, said weights, by means of the pressure fluid, checking the first mentioned casings and driven shaft whereby said shaft participates in the motion.

13. An automatically variable change speed gear device as claimed in claim 1, characterized by the provision of means constituted in part by a casing for circulating and cooling the pressure fluid.

DAVID WERNER BERLIN.